July 5, 1932. M. H. PAGE Re. 18,512
ADVERTISING DEVICE
Original Filed Feb. 9, 1929 2 Sheets-Sheet 1
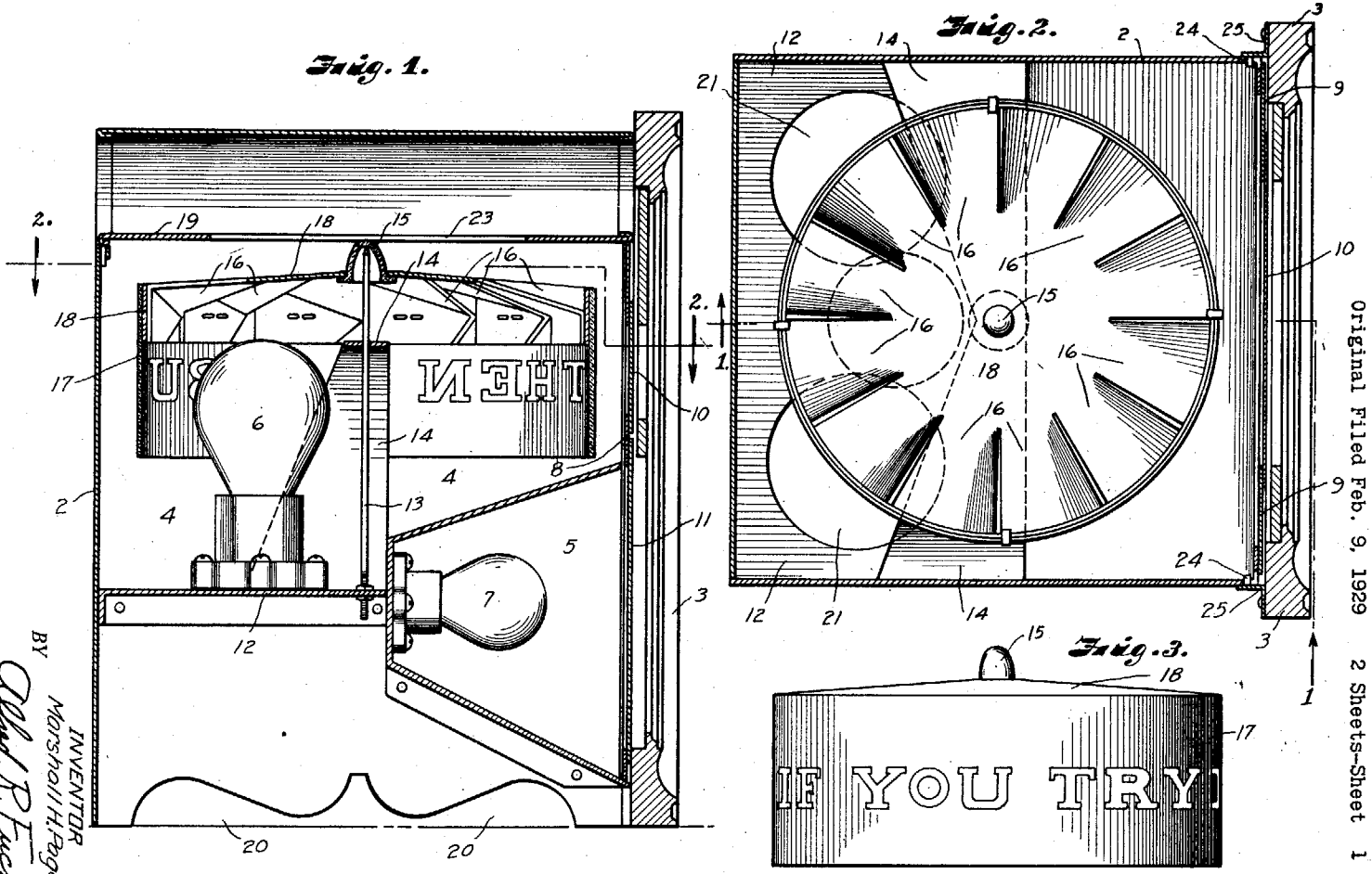
INVENTOR
Marshall H. Page
BY Alfred R. Fuchs
ATTORNEY.

July 5, 1932. M. H. PAGE Re. 18,512
ADVERTISING DEVICE
Original Filed Feb. 9, 1929 2 Sheets-Sheet 2
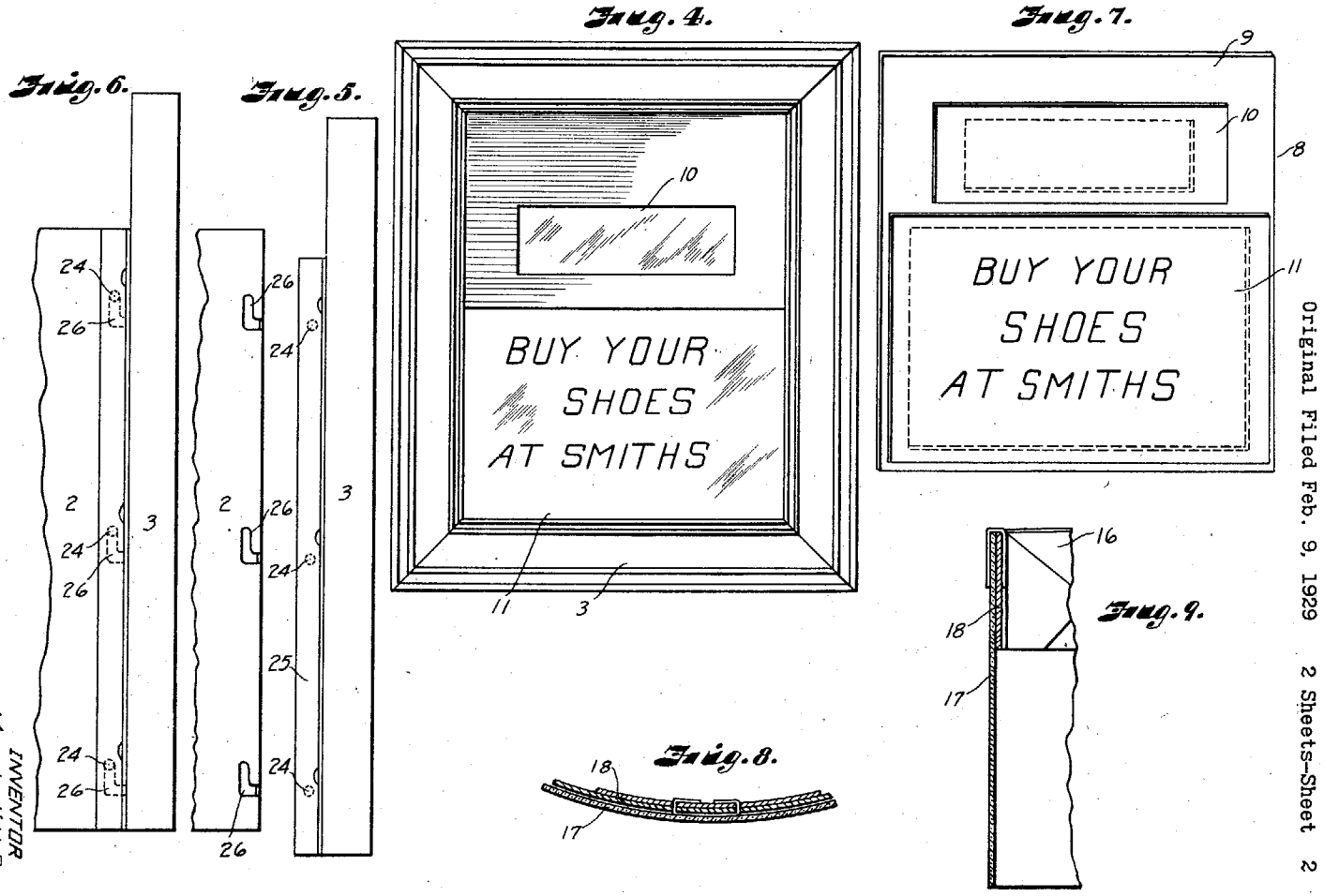
INVENTOR
Marshall H. Page
BY
Alfred R. Fuchs
ATTORNEY.

Reissued July 5, 1932

Re. 18,512

UNITED STATES PATENT OFFICE

MARSHALL H. PAGE, OF KANSAS CITY, MISSOURI, ASSIGNOR, BY DIRECT AND MESNE ASSIGNMENTS, TO LINE-O-GRAPH COMPANY, OF KANSAS CITY, MISSOURI, A CORPORATION OF MISSOURI

ADVERTISING DEVICE

Original No. 1,781,596, dated November 11, 1930, Serial No. 338,698, filed February 9, 1929. Application for reissue filed August 17, 1931. Serial No. 557,706.

It is an object of my invention to provide cheap, durable, reliable and effective advertising signs, which will perform the double function of providing a moving line of matter on one sign and making the light appear and disappear on another sign adjacent to the first to provide a flashing or intermittent characteristic thereto, so that attention will be attracted and interest aroused at all times when the device is in operation.

It is another object of my invention to provide an illuminated display device of the above mentioned character in which the sign providing the moving line of reading matter, comprises a rotor mounted in one compartment, and the sign having the intermittent characteristic comprises a flashing light in another compartment, said compartments being provided with means to prevent the passage of light from one to the other thereof and the rotor compartment having a portion in vertical alignment with the other compartment, so that the rotor can be arranged with its cylindrical side wall portion closely adjacent an opening provided with a transparent closure member, through which the moving line of reading matter is visible to create the impression that the reading matter is moving along in a straight path instead of a curved path.

These objects are accomplished by my invention, one embodiment of which is hereinafter more particularly set forth.

For a more detailed description of my invention, reference is to be had to the accompanying drawings, forming a part hereof, in which Figure 1 is a longitudinal vertical section of one embodiment of my invention, the section being taken on the line 1—1 of Figure 2, looking in the direction of the arrows.

Figure 2 is a sectional view, taken on the line 2—2 of Figure 1, looking in the direction of the arrows.

Figure 3 is a side elevation of the rotor for the moving sign.

Figure 4 is a front elevation of the device showing the parts in which signs appear, or pictures or other advertisement, with changing effects, as above noted.

Figures 5 and 6 are fragmentary side elevations showing how the front is attached or removed from the body of the apparatus.

Figure 7 shows a slide which may be inserted between the front and body portion of the housing.

Figures 8 and 9 are sectional views of the rotor shown in Figure 3.

Throughout the various views of the drawings, similar reference characters designate similar parts.

My improved advertising device has a housing 2 closed by a removable front 3 and provided with two chambers 4 and 5 in which are placed electric lights 6 and 7 which are mounted and connected in the conventional way. In the preferred embodiment of my invention, a light 7 is employed which is of the intermittent type, that is, as soon as it illuminates it goes out. The chambers 4 and 5 are open at the front and adjacent to a removable sign 8, shown in Figure 7, which has a frame 9 with two openings covered by transparencies 10 and 11, the transparency 10 being preferably made of colored, translucent paper and carrying no lettering or figures or pictures. The sign 11 is also translucent and carries any desired ornament, letters, etc. Care is taken so as to make the chambers 5 and 4 so that light will not leak from one to the other.

The horizontal bottom wall 12 of the chamber 4 is secured to the frame 2, in any suitable manner, and in front of the lamp 6, or at any other convenient location, it carries a spindle or pivot 13 which is fixed therein in any desired way and preferably held true by a bracket 14. The upper end of the spindle 13 is pointed and is adapted to engage a glass center 15 from which radiate the vanes 16 of the rotor 18 in the conventional manner, and the outer ends of these vanes are secured to a transparency 17, which carries any desired lettering, or other sign, in register with the window 10. As the heated air rises from the lamp 6 it engages the vanes 16 causing the rotor 18, of which they form a part, to revolve. The light from the lamp 6 passes through the member 17 and letters, or other features on this part 17, are projected on the window 10 and constantly pass thereover, so that it is easy to read a sign provided on this rotor through said window. Immediately below is another sign on the window 11 which is illuminated intermittently by the lamp 7.

The casing 2 is closed at its top by a suitable hinged cover 19 which may be made in any conventional way, but is preferably provided with a passage therethrough so that air may enter through the openings 20 at the bottom of the casing 2, pass through suitable openings 21 in the horizontal wall 12, and about the lamp 6 and up through the vanes 16 to an opening 23 in the cover 19 and thence out through the opening provided between the spaced top and bottom walls of said cover 19 at the rear thereof. The front 3 may be secured to the casing 2 in any suitable way, as by means of the pins 24 which extend inwardly from flanges 25 which form a part of the front and into bayonet slots 26 in the casing 2.

In view of the foregoing, the operation of my improved advertising device will be readily understood. Assuming that the lights 6 and 7 are illuminated and function, as above described, air enters through the openings 20 and 21, passes by the light 6, where it is heated, and thence passes upwardly to the vanes 16 which drive the rotor 18 so that the rotor revolves in a proper direction, and thence outwardly through the openings 23 in the top 19. The rotation of the rotor 18 causes the same to function as a moving picture device so that a picture, or letters, or numerals, or what not, may be projected on the window 10, as above set forth, whereby a sign with constantly changing characteristics appears on this window. Due to the location of the transparency or side wall portion 17 of the rotor closely adjacent the translucent window 10 in the front wall of the device, the letters or other characters on the rotor will appear as a moving line of matter on the flat surface of the transparency 10 rather than on a cylindrical surface, such as that of the member 17. At the lower window 11 is another sign which may be continuously illuminated, but is preferably intermittently illuminated, as above set forth.

In order to locate the windows 10 and 11 in substantially the same plane and the cylindrical member 17 on the rotor closely adjacent the window 10, the chamber 4 is arranged to have a portion thereof extend over the chamber 5 to the front of the device. These signs are reliable and will function until a light burns out, at which time it must be replaced for further operation of the device.

While I have shown and described one embodiment of my invention, it is obvious that it is not restricted thereto, but that it is broad enough to cover all structures that come within the scope of the annexed claims.

What I claim is:—

1. In an advertising device, a rotor compartment and a stationary sign compartment, said rotor compartment having a rotatable sign mounted therein, said rotor compartment having a horizontal wall portion, a vertical wall portion in said device intersecting said horizontal wall portion and upper and lower walls extending forwardly from said vertical wall portion, said vertical wall portion and said upper forwardly extending wall separating said two compartments and together with said lower forwardly extending wall forming said stationary sign compartment, said rotatable sign being provided with means for driving the same, and being mounted in its compartment so as to project over said upper forwardly extending wall portion, a window in front of said rotatable sign, so that the characters on said rotatable sign may be read during movement thereof through said window, a stationary sign in front of said stationary sign compartment and means in said last named compartment for illuminating said stationary sign.

2. In a display device, a housing having a front provided with a pair of vertically spaced openings, light transmitting closures for said openings, partition means in said housing dividing the same into a pair of compartments, one of said compartments being located adjacent said front rearwardly of one of said openings and the other of said compartments comprising a portion lying rearwardly of said first compartment and having air inlet means in the bottom thereof and a forwardly extending portion located adjacent said front rearwardly of the other of said openings, a rotor in said last mentioned compartment, display means on the periphery of said rotor, said partition means comprising a wall separating the forwardly extending portion of said rotor compartment from said first compartment, and independent illuminating means for each of said compartments, said rotor extending into said forwardly extending portion of said rotor compartment to locate the periphery thereof adjacent said front.

3. In a display device, a housing having partition means therein dividing the same into a pair of compartments each extending to the front of said device, a translucent window in the front of one of said compartments, a rotor in said compartment having a peripheral display portion lying closely adjacent said window and in alignment therewith, illuminating means in said compartment, said compartment having an air discharge opening in the top thereof, and said housing and partition means providing an air passage leading from externally of said housing into the bottom of said rotor, said passage extending upwardly from the bottom of said housing in back of said other compartment, display means at the front of said other compartment, and means for illuminating said other compartment and the display means associated therewith.

4. In a display device, a housing having partition means therein dividing the same into a pair of compartments each extending to the front of said device, one of said compartments overlying the other of said compartments and having a translucent window in front of the same, a rotor in said compartment overlapping said other compartment with the peripheral portion thereof lying closely adjacent said window and having display means thereon aligning with said window, illuminating means in said compartment extending into said rotor, means for intermittently illuminating said other compartment, and display means in front of the same, said partition means preventing the passage of light from one of said compartments to the other thereof and providing an air supply passage to said rotor located below the same and rearwardly of said other compartment.

5. In a display device, a housing having partition means therein dividing the same into a rotor compartment extending from the front to the rear of said device and a shallow compartment extending from the front of said device rearwardly only a portion of the distance to the rear of said device, a rotor in said rotor compartment, a screen at the front of said rotor compartment, display means on the periphery of said rotor, said shallow compartment underlying the front portion of said rotor compartment, intermittent illuminating means therein, display means at the front of said shallow compartment illuminated thereby, said partition means comprising a vertical wall portion forming the rear wall of said shallow compartment and in cooperation with said housing defining an air inlet passage for supplying air from adjacent the bottom of said housing to the rotor and a wall portion extending forwardly from said vertical wall portion to provide a top wall for said shallow compartment, said wall portions preventing the passage of light from either compartment to the other thereof, illuminating means within said rotor and means for mounting said rotor so as to overlap the top wall of said shallow compartment with the peripheral portion thereof lying adjacent the front of said housing.

6. In a display device, a housing having partition means therein dividing the same into a rotor compartment extending from the front to the rear of said device and a shallow compartment extending from the front of said device rearwardly only a portion of the distance to the rear of said device, a rotor in said rotor compartment, a screen at the front of said rotor compartment, display means on the periphery of said rotor, said shallow compartment underlying the front portion of said rotor compartment, intermittent illuminating means therein, display means at the front of said shallow compartment illuminated thereby, said partition means comprising a vertical wall portion forming the rear wall of said shallow compartment and in cooperation with said housing defining an air inlet passage for supplying air from adjacent the bottom of said housing to the rotor and a wall portion extending forwardly from said vertical wall portion to provide a top wall for said shallow compartment, said wall portions preventing the passage of light from either compartment to the other thereof, illuminating means within said rotor, means for mounting said rotor so as to overlap the top wall of said shallow compartment with the peripheral portion thereof lying adjacent the front of said housing, an ornamental front for said housing and means for detachably connecting said ornamental front with said housing.

7. In a display device, a housing having partition means therein dividing the same into an upper rotor compartment, a lower compartment extending under only a portion of said upper compartment, both compartments being open toward the front of said device, light transmitting display screens closing the fronts of said compartments and an air duct open to the outside air and leading into said rotor compartment from the lower portion of said housing but separated from said lower compartment by said partition means, a rotor having display means thereon in said rotor compartment overlapping said lower compartment and independent illuminating means in said compartments.

8. In a display device, a housing having partition means therein dividing the same into an upper rotor compartment, a lower compartment extending under only a portion of said upper compartment, both compartments being open toward the front of said device, light transmitting display screens closing the fronts of said compartments and an air duct open to the outside air and leading into said rotor compartment from the lower portion of said housing but separated from said lower compartment by said partition means, a rotor having display means thereon in said rotor compartment overlapping said lower compartment and independent illuminating means in said compartments, said housing having a horizontal wall portion therein between said rotor and said air duct, said horizontal wall portion having air inlet means therein underlying said rotor.

9. In a device of the character described a housing comprising a rotor compartment and a compartment having stationary transparent display means at the front thereof, a rotor in said rotor compartment having peripheral display means thereon, a screen at the front of said rotor compartment, walls in said housing preventing the passage of light from one of said compartments to the other thereof, said walls comprising a horizontal wall and a vertical wall intersecting the same, a light in said rotor compartment mounted on the upper face of said horizontal wall and a light in said other compartment mounted on the forward face of said vertical wall.

In testimony whereof I hereunto subscribe my name this 15th day of July, 1931.

MARSHALL H. PAGE.